United States Patent
Bao et al.

(10) Patent No.: US 11,132,824 B2
(45) Date of Patent: Sep. 28, 2021

(54) FACE IMAGE PROCESSING METHOD AND APPARATUS, AND ELECTRONIC DEVICE

(71) Applicant: SHENZHEN SENSETIME TECHNOLOGY CO., LTD., Shenzhen (CN)

(72) Inventors: Xu Bao, Shenzhen (CN); Guijie Wang, Shenzhen (CN); Jianbo Liu, Shenzhen (CN); Canbin Wang, Shenzhen (CN); Chenghao Liu, Shenzhen (CN); Ting Liao, Shenzhen (CN); Ligen Dai, Shenzhen (CN); Wenliang Zeng, Shenzhen (CN)

(73) Assignee: SHENZHEN SENSETIME TECHNOLOGY CO., LTD., Shenzhen (CN)

( * ) Notice: Subject to any disclaimer, the term of this patent is extended or adjusted under 35 U.S.C. 154(b) by 23 days.

(21) Appl. No.: 16/600,457

(22) Filed: Oct. 12, 2019

(65) Prior Publication Data

US 2020/0043213 A1 Feb. 6, 2020

Related U.S. Application Data

(63) Continuation of application No. PCT/CN2018/082180, filed on Apr. 8, 2018.

(30) Foreign Application Priority Data

Apr. 14, 2017 (CN) .......................... 201710247289.0

(51) Int. Cl.
*G06T 11/60* (2006.01)
*G06K 9/00* (2006.01)
(Continued)

(52) U.S. Cl.
CPC .......... *G06T 11/60* (2013.01); *G06K 9/00241* (2013.01); *G06K 9/00261* (2013.01);
(Continued)

(58) Field of Classification Search
None
See application file for complete search history.

(56) References Cited

U.S. PATENT DOCUMENTS 8,295,557 B2 10/2012 Wang
8,379,958 B2 2/2013 Kaku
(Continued)

FOREIGN PATENT DOCUMENTS

CN 101667248 A 3/2010
CN 103413270 A 11/2013
(Continued)

OTHER PUBLICATIONS

Yamashita, Takayoshi, et al. "Cost-alleviative learning for deep convolutional neural network-based facial part labeling." IPSJ Transactions on Computer Vision and Applications 7 (2015): 99-103.*
(Continued)

*Primary Examiner* — Zhengxi Liu
(74) *Attorney, Agent, or Firm* — Syncoda LLC; Feng Ma

(57) ABSTRACT

A face image processing method includes: performing face detection on a to-be-processed image, to obtain at least one face region image included in the to-be-processed image and face key point information in the at least one face region image; and processing, for the at least one face region image, an image corresponding to a first region and/or an image corresponding to a second region in the face region image at least according to the face key point information in the face region image, wherein the image corresponding to the second region and the image corresponding to the first region are at least partially non-overlapping.

19 Claims, 8 Drawing Sheets

(51) Int. Cl.
*G06K 9/46* (2006.01)
*G06T 5/00* (2006.01)
*G06T 11/00* (2006.01)

(52) U.S. Cl.
CPC ....... *G06K 9/00281* (2013.01); *G06K 9/4609* (2013.01); *G06T 5/002* (2013.01); *G06T 11/001* (2013.01)

(56) References Cited

U.S. PATENT DOCUMENTS

| | | | |
|---|---|---|---|
| 9,864,901 | B2 | 1/2018 | Chang |
| 2017/0076142 | A1 | 3/2017 | Chang |
| 2017/0262970 | A1* | 9/2017 | Chen ................. G06K 9/00302 |
| 2018/0204051 | A1* | 7/2018 | Li ........................... G06T 5/001 |

FOREIGN PATENT DOCUMENTS

| | | |
|---|---|---|
| CN | 103544478 A | 1/2014 |
| CN | 103632165 A | 3/2014 |
| CN | 103824049 A | 5/2014 |
| CN | 104573614 A | 4/2015 |
| CN | 104680121 A | 6/2015 |
| CN | 104715224 A | 6/2015 |
| CN | 104952036 A | 9/2015 |
| CN | 104992167 A | 10/2015 |
| CN | 104992402 A | 10/2015 |
| CN | 105069007 A | 11/2015 |
| CN | 105426870 A | 3/2016 |
| CN | 105447823 A | 3/2016 |
| CN | 105654420 A | 6/2016 |
| CN | 105657249 A | 6/2016 |
| CN | 105787878 A | 7/2016 |
| CN | 105869159 A | 8/2016 |
| WO | 2015078007 A1 | 6/2015 |
| WO | 2015127394 A1 | 8/2015 |

OTHER PUBLICATIONS

Shorten, Connor, and Taghi M. Khoshgoftaar. "A survey on image data augmentation for deep learning." Journal of Big Data 6.1 (2019): 60.*
Smith, Brandon M., et al. "Exemplar-based face parsing." Proceedings of the IEEE Conference on Computer Vision and Pattern Recognition. 2013.*
Lv JJ, Shao XH, Huang JS, Zhou XD, Zhou X. Data augmentation for face recognition. Neurocomputing. Mar. 22, 2017;230:184-96.*
Second Office Action of the Chinese application No. 201710247289.0, dated Nov. 5, 2019.
Notice of Allowance of the Chinese application No. 201710247289.0, dated Apr. 13, 2020.
International Search Report in the international application No. PCT/CN2018/082180, dated Jul. 9, 2018.
English translation of the Written Opinion of the International Search Authority in the international application No. PCT/CN2018/082180, dated Jul. 9, 2018.
First Office Action of the Chinese application No. 201710247289.0, dated Apr. 26, 2019.
Masatoshi Kimura et al. "Facial point detection based on a convolutional neural network with optimal mini_batch procedure"; 2015 IEEE International Conference on Image Processing (ICIP), Sep. 30, 2015 (Sep. 30, 2015), pp. 2860-2864.
Hani Altwaijry et al. "Learning to Detect and Match Keypoints with Deep Architectures"; British Machine Vision conference, Jan. 31, 2016 (Jan. 31, 2016), pp. 49.1-49.12.
Hou Alin et al. "Garment image retrieval based on multi features"; Modem Electronic Technology, Mar. 15, 2010 (Mar. 15, 2010), pp. 171-175.
International Search Report in the international application No. PCT/CN2018/082181, dated Jun. 7, 2018.
English translation of the Written Opinion of the International Search Authority in the international application No. PCT/CN2018/082181, dated Jun. 7, 2018.
First Office Action of the Chinese application No. 201710244395.3, dated Dec. 19, 2019.
Fred L. Bookstein. "Principal Warps:Thin-Plate Splines and the Decomposition of Deformations", mailed on Jun. 6, 1989.

* cited by examiner

FACE IMAGE PROCESSING METHOD AND APPARATUS, AND ELECTRONIC DEVICE

CROSS-REFERENCE TO RELATED APPLICATIONS

The present application is a continuation of International Application No. PCT/CN2018/082180 filed on Apr. 8, 2018, which claims priority to Chinese Patent Application No. 201710247289.0 filed on Apr. 14, 2017. The disclosures of these applications are hereby incorporated by reference in their entirety.

BACKGROUND

In recent years, with the popularization and development of computer vision technologies, the use of computers or the like to perform face beautification processing on images has been applied to more and more scenarios.

SUMMARY

The embodiments of the present disclosure relate to the technical field of computer vision, and in particular, to a face image processing method and apparatus, and an electronic device.

Embodiments of the present disclosure provide a face image processing scheme.

According to a first aspect of the embodiments of the present disclosure, provided is a face image processing method, including: performing face detection on a to-be-processed image, to obtain at least one face region image included in the to-be-processed image and face key point information in the at least one face region image; and processing, for the at least one face region image, an image corresponding to a first region and/or an image corresponding to a second region in the face region image at least according to the face key point information in the face region image, where the image corresponding to the second region and the image corresponding to the first region are at least partially non-overlapping.

According to a second aspect of the embodiments of the present disclosure, provided is a face image processing apparatus, including: an image detecting module, configured to perform face detection on a to-be-processed image, to obtain at least one face region image included in the to-be-processed image and face key point information in the at least one face region image; and a face region image processing module, configured to process, for the at least one face region image, an image corresponding to a first region and/or an image corresponding to a second region in the face region image at least according to the face key point information in the face region image, where the image corresponding to the second region and the image corresponding to the first region are at least partially non-overlapping.

According to a third aspect of the embodiments of the present disclosure, provided is a face image processing apparatus, including: a memory storing processor-executable instructions; and a processor arranged to execute the stored processor-executable instructions to perform steps of: performing face detection on a to-be-processed image, to obtain at least one face region image included in the to-be-processed image and face key point information in the at least one face region image; and processing, for the at least one face region image, at least one of an image corresponding to a first region or an image corresponding to a second region in the face region image at least according to the face key point information in the face region image, wherein the image corresponding to the second region and the image corresponding to the first region are at least partially non-overlapping.

According to a fourth aspect of the embodiments of the present disclosure, provided is an electronic device, including: a processor, a memory, a communication element, and a communication bus, where the processor, the memory, and the communication element communicate with one another by means of the communication bus; and the memory is configured to store at least one executable instruction, and the executable instruction enables the processor to execute operations corresponding to the face image processing method according to any item of the first aspect.

According to a fifth aspect of the embodiments of the present disclosure, provided is another computer-readable storage medium; the computer-readable storage medium stores a computer program; the computer program includes computer instructions, and when the computer instructions run in an electronic device, a processor in the electronic device executes operations corresponding the face image processing method according to any item of the first aspect.

According to a sixth aspect of the embodiments of the present disclosure, provided is a computer program, including computer instructions, where when the computer instructions run in a processor of a device, the processor executes operations corresponding to the face image processing method according to any item of the first aspect.

BRIEF DESCRIPTION OF DRAWINGS

The accompanying drawings constituting a part of the specification describe the embodiments of the present disclosure and are intended to explain the principles of the present disclosure together with the descriptions. According to the following detailed descriptions, the present disclosure may be understood more clearly with reference to the accompanying drawings.

DETAILED DESCRIPTION

Figure 1:
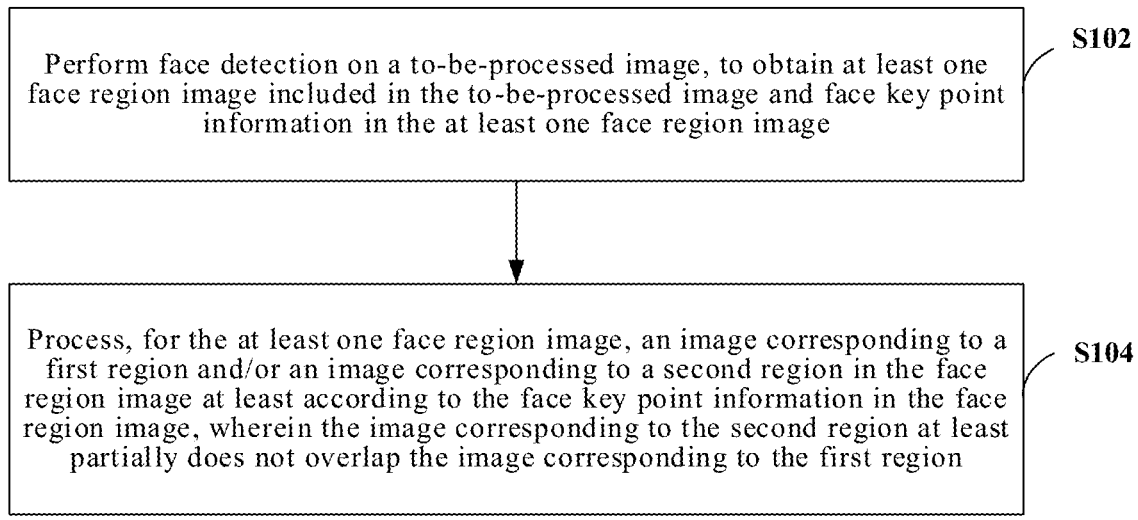
FIG. 1 is a flowchart of operations of a face image processing method according to an embodiment of the present disclosure.

Various specific implementations of embodiments of the present disclosure are further described in detail below with reference to the accompanying drawings (the same reference numerals in a plurality of accompanying drawings represent the same elements) and the embodiments. The following embodiments are intended to illustrate the present disclosure, but are not intended to limit the scope of the present disclosure.

Persons skilled in the art may understand that the terms such as "first" and "second" in the embodiments of the present disclosure are only used to distinguish different operations, devices or modules, etc., and do not represent any specific technical meaning or an inevitable logical sequence therebetween.

Referring to FIG. 1, a flowchart of operations of a face image processing method according to an embodiment of the present disclosure is shown.

The face image processing method in the embodiments includes the following operations S102 to S104.

At operation S102, face detection is performed on a to-be-processed image, to obtain at least one face region image included in the to-be-processed image and face key point information in the at least one face region image.

In the embodiments of the present disclosure, a face image means an image containing a face. A face image may include one face, and may also include multiple (two or more) faces. The face image processing method of the present disclosure is applicable to a to-be-processed image including one face or multiple faces. The to-be-processed image may be a static image, and may also be a video frame image in a dynamic video frame sequence. That is, the face image processing method of the present disclosure can process static images (such as photos), and may also process dynamic videos. The face image processing method of the present disclosure may process a single face image, and may also continuously process multiple face images.

By performing face detection on the to-be-processed image, all face region images in the to-be-processed image can be obtained, and face key point information in each face region image is determined. The face key point information may represent feature points of a face, and the shape and position of the face contour, and the shapes and positions of the five sense organs and the hair may be basically determined through face key points.

In the embodiments of the present disclosure, the specific implementation mode of this operation may be adopted by persons skilled in the art to implement face region image acquisition and face key point information acquisition according to actual needs in any appropriate mode, for example, a mode of neural network detection, and the like. The specific implementation mode of this operation is not limited in the embodiments of the present disclosure.

At operation S104, for the at least one face region image, an image corresponding to a first region and/or an image corresponding to a second region in the face region image in the face region image are processed at least according to the face key point information in the face region image, where the image corresponding to the second region and the image corresponding to the first region are at least partially non-overlapping.

For each face region image, different processing is performed on the image corresponding to the first region and/or the image corresponding to the second region according to different processing requirements. Since the image corresponding to the second region and the image corresponding to the first region are at least partially non-overlapping, the images corresponding to corresponding regions are processed according to different processing performed, which is beneficial to satisfy the processing requirements, is beneficial to ensure the processing effect, and is beneficial to make the processed images natural.

By performing face detection on the to-be-processed image, at least one face region image in the to-be-processed image and face key point information in each face region image can be obtained, and according to the face key point information of each one face region image, corresponding processing may be performed on each face region image, so as to satisfy different processing requirements for the face image.

The processing requirements include, but are not limited to, beautification, cartoonization, artification and the like. The image corresponding to the first region and/or the image corresponding to the second region in the face region image are processed according to different processing requirements, and because the image corresponding to the first region and the image corresponding to the second region are at least partially non-overlapping, it is beneficial to make the processing more targeted, and is beneficial to make the processing effect better. It is beneficial to satisfy the differentiated image processing requirements of a user and is beneficial to improve the processing effect.

The face image processing method in the embodiments may be performed by any appropriate device having image or data processing capability, including, but not limited to, a mobile terminal, a Personal Computer (PC), a server, a vehicle-mounted device, an entertainment device, an advertisement device, or the like.

Figure 2:
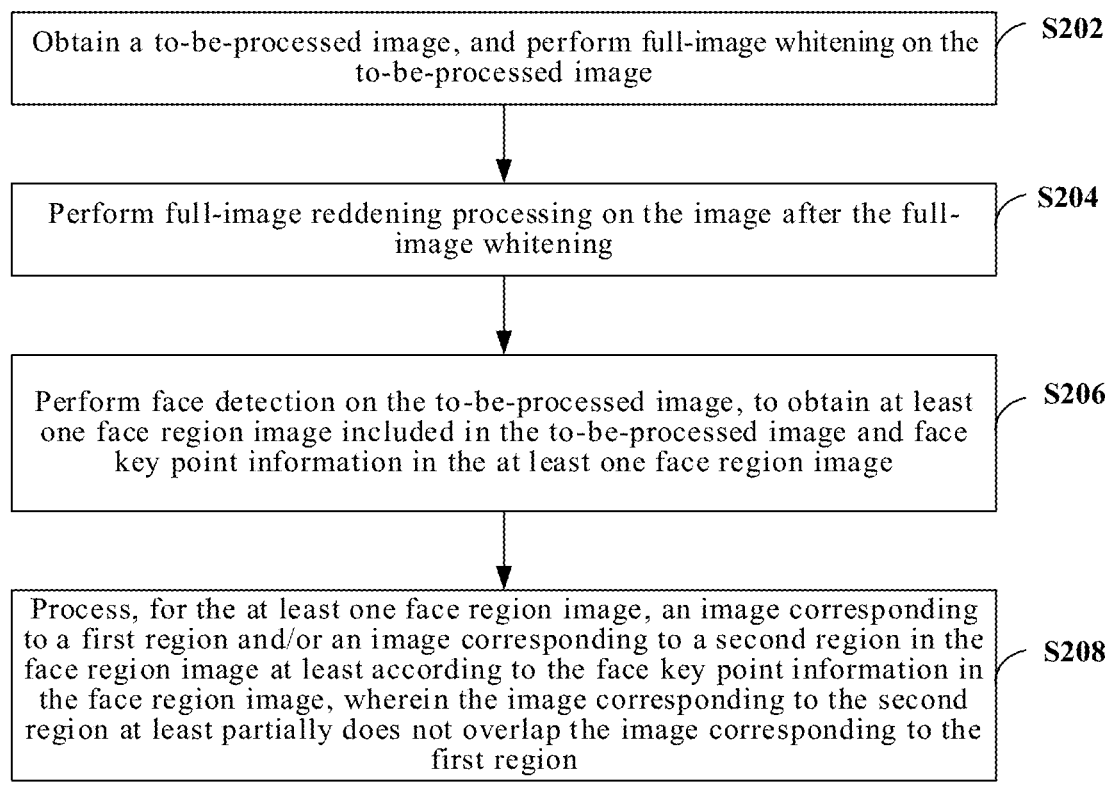
FIG. 2 is a flowchart of operations of another face image processing method according to an embodiment of the present disclosure.

Referring to FIG. 2, a flowchart of operations of a face image processing method according to an embodiment of the present disclosure is shown.

At operation 202, a to-be-processed image is obtained, and full-image whitening is performed on the to-be-processed image.

This operation is an optional operation. Performing full-image whitening on the to-be-processed image may improve the brightness of the to-be-processed image, which is beneficial to make the subsequent face detection more convenient, and is beneficial to make the effect of face detection better. In the embodiments, performing full-image whitening on the image may be implemented by using a segmentation curve to stretch the image brightness of the image. Specifically, the brightness of the image is stretched through the segmentation curve, the exposure at low light is enhanced, the exposure at highlight is suppressed, and the overall brightness of the image is improved, thereby implementing the full-image whitening. The image after the full-image whitening may be recorded as "image1", and the original image before the full-image whitening may be recorded as "source".

In the embodiments, only the mode of implementing the full-image whitening is exemplified, and persons skilled in the art can select any technical solution for implementing full-image whitening according to actual needs.

At operation 204, full-image reddening processing is performed on the image after the full-image whitening.

This operation is an optional operation. Performing full-image reddening processing on the image after the full-image whitening may further make subsequent face positioning more convenient, and is beneficial to make the beautification effect of the image after final processing better. In the embodiments, the image after the full-image whitening is transformed into a YUV color space, and then full-image reddening processing is performed on the image after the full-image whitening.

By calculating the brightness mapping table of a Y channel in the YUV color space, full-image brightening in the full-image reddening processing is performed according to the following formula 1:

whiten_table[$Y$]=round(pow($Y$/255.0,whiten_strenth)*255);   (formula 1)

where, whiten_table[Y] refers to the value of the Y channel. Whiten_strenth refers to the brightening ratio, the value of which ranges from 0.0 to 1.0 (including 0.0 and 1.0). In this operation, it is able to perform no brightening processing, and if no brightening processing is performed, the value of whiten_strenth is 0.0. This operation may also be omitted directly.

Pow(Y/255.0, whiten_strenth) refers to the whiten_strenth power of Y/255.0. That is, the pow function is a function for calculating b (the second parameter) power of a (the first parameter).

Round(pow(Y/255.0, whiten_strenth)*255) refers to calculating the nearest integer of pow(Y/255.0,whiten_strenth)*255. That is, the round function is a rounding function.

The full-image reddening processing continues to be performed on the face image in the YUV color space. The formula is as follows:

$$Y\text{Plus}=0.2578*15*\text{tone\_strenth}; \quad \text{(formula 2)}$$

$$U\text{Plus}=0.1454*15*\text{tone\_strenth}; \quad \text{(formula 3)}$$

$$V\text{Plus}=0.4375*15*\text{tone\_strenth}; \quad \text{(formula 4)}$$

$$Yptr\text{Output}[Y\_\text{index}]=(\text{whiten\_table}[Y]+Y\text{Plus}>255)?255:\text{whiten\_table}[Y]+Y\text{Plus}; \quad \text{(formula 5)}$$

$$Uptr\text{Output}[U\_\text{index}]=(Uptr\text{InPut}[U\_\text{index}]+U\text{plus}>255)?255:Uptr\text{InPut}[U\_\text{index}]+U\text{Plus}; \quad \text{(formula 6)}$$

$$Vptr\text{Output}[V\_\text{index}]=(Vptr\text{InPut}[V\_\text{index}]+V\text{plus}>255)?255:Vptr\text{InPut}[V\_\text{index}]+V\text{Plus}; \quad \text{(formula 7)}$$

where, Yplus/Uplus/VPlus represents the adjusted value of each component. Tone_strenth represents the adjusting ratio, and the value of which ranges from 0.0 to 1.0 (including 0.0 and 1.0); whiten_table is the brightness mapping table, and the calculation formula is as stated above. Y/UptrinPut/VptrinPut is the value of each component of a to-be-reddened image Y/u/v. YptrOutput/UptrOutput/VptrOutput is the adjusted output value of each component. U_index/V_index is the index of each pixel.

When performing full-image reddening, only a U channel and a V channel may be processed. The image after the full-image whitening and reddening processing may be recorded as "image2".

At operation S206, face detection is performed on the to-be-processed image, to obtain at least one face region image included in the to-be-processed image and face key point information in the at least one face region image.

In the present disclosure, face detection may be performed on the image after the full-image whitening and the full-image reddening processing ("image2"), to obtain face position information of each face and face key point information of each face. The face region image may be obtained according to the face position information, and the face region image may be recorded as "FaceReg". Each face region image includes one face.

When two or more faces are included in the to-be-processed image, one face region image may be generated for each face in the present disclosure. The face region image may be an image of a region containing a face selected from the to-be-processed image.

In some embodiments, the performing face detection on the to-be-processed image includes: performing face detection on the to-be-processed image by means of a pre-trained neural network model.

The training of a neural network model includes operations A to F.

At operation A, an original sample image is obtained.

The original sample image includes face feature point labeling information, that is, the face feature points are previously labeled on the original sample image to perform face feature point detection training on a neural network such as a convolutional neural network.

At operation B, scrambling processing is performed on the original sample image to obtain a scrambled sample image, and image information processed by information retention scrambling processing.

In the embodiments, scrambling processing is performed on each original sample image to generate a new image, i.e., a scrambled sample image. Both the original sample image and the scrambled sample image are input to the convolutional neural network to perform convolutional neural network training. In addition, the image information subjected to the information retention scrambling processing is recorded, including information about a difference between the original image information and the image information after the scrambling processing.

In the embodiments, the scrambling process performed on the original sample image includes not only information retention scrambling processing but also information non-retention scrambling processing. In the convolutional neural network training for jitter prevention, scrambling the original sample image by using information retention scrambling processing so as to train the convolutional neural network may make the training more targeted; moreover, scrambling the original sample image by using not only the information retention scrambling processing but also the information non-retention scrambling processing so as to train the convolutional neural network may not only train the anti jitter performance of the convolutional neural network, but also may enable the convolutional neural network to identify and further detect different images, which is beneficial to improve the detection performance of the convolutional neural network. However, since the information non-retention scrambling processing does not affect the output of the face feature points by the convolutional neural network, only the image information subjected to the information retention scrambling processing may be recorded.

Both the information retention scrambling processing and the information non-retention scrambling processing on the original sample image may be performed by persons skilled in the art in any appropriate mode, for example, performing the information non-retention scrambling processing through contrast adjustment or a Gaussian noise function, the information retention scrambling processing is performed through rotation stretching or a displacement transformation function or an affine transformation function, and the like. However, no limitation is made thereto, and other scrambling processing is also applicable.

At operation C, the original sample image and the scrambled sample image are input to the convolutional neural network for detection training, to obtain first prediction information for the face feature points in the original sample image and second prediction information for the face feature points in the scrambled sample image.

The original sample image and the scrambled sample image are input to the convolutional neural network for detection training, to respectively obtain corresponding prediction information. A convolutional layer portion in the convolutional neural network may adopt a conventional convolutional layer portion, including, but not limited to, a convolutional layer, a nonlinear response unit (the nonlinear response unit includes, but is not limited to, an ReLU layer), a feature extraction layer, a calculation layer, etc.; the processing on the original sample image and the scrambled sample image may be performed with reference to the processing of the related convolutional neural network. The details are not described here again. After the detection training of the convolutional neural network, the corresponding prediction information is obtained. For the original sample image, the prediction information is a detection result of the face feature points in the original sample image. For the scrambled sample image, the prediction information is the detection result of the face feature points in the scrambled sample image (the prediction information of a certain time may be understood as an output result of the convolutional neural network in a certain training process).

At operation D, a first difference between the first prediction information and the face feature point labeling information in the original sample image and a second difference between the first prediction information and the second prediction information are determined.

In the embodiments, the first difference between the first prediction information and the face feature point labeling information in the original sample image is determined using a first loss function, and the second difference between the first prediction information and the second prediction information is determined using a second loss function.

The first loss function is used for measuring the accuracy of a face feature point prediction result in the original sample image, and the second loss function is used for measuring a difference between the face feature point prediction result in the original sample image and a face feature point prediction result in the scrambled sample image. The first loss function may be a loss function in a conventional convolutional neural network, such as a EuclideanLoss function and a SmoothL1Loss function, and a loss value obtained through the first loss function is a first loss value. The second loss function may be a function for appropriately measuring the difference between the two test results. In an optional solution, an appropriate distance calculation function (to distinguish it from the subsequent distance calculation function, the distance calculation function is recorded as the first distance calculation function) may be used as the second loss function, and in this case, the first prediction information and the second prediction information are first obtained. The distance between the first prediction information and the second prediction information is calculated using the first distance calculation function. The distance is determined as a second loss value, which is the second difference. The first distance calculation function may be any appropriate function, such as a Euclidean distance calculation function and a Mahalanobis distance calculation function.

It should be noted that the executions of obtaining the first difference and obtaining the second difference may be performed in no particular order, for example, may be performed in parallel.

At operation E, a third difference is obtained according to the second difference and the image information subjected to the information retention scrambling processing.

In an optional mode, a distance between the second difference and the image information subjected to the information retention scrambling processing may be obtained by means of a second distance calculation function, and the distance is the third difference. The second distance calculation function may be any appropriate function, such as a Euclidean distance calculation function and a Mahalanobis distance calculation function.

At operation F, network parameters of the neural network are adjusted according to the first difference and the third difference.

The first difference and the third difference are both used as the basis for updating the convolutional neural network, which is beneficial to make the parameter update more effective, and thus is beneficial to enable the trained convolutional neural network to accurately perform face positioning, and is beneficial to reduce the face jitter of two adjacent frames in the video.

The training of the convolutional neural networks is an iterative process that requires a training termination condition, and the condition may be, for example, iterative training times, and may also be, for example, a convergence condition. Therefore, it can be determined whether the training of the convolutional neural network satisfies a predetermined training termination condition; if the condition is not satisfied, the network parameters of the convolutional neural network are adjusted according to the first difference and the third difference, and the convolutional neural network continues to be trained using the adjusted network parameters until the predetermined training termination condition is satisfied; and if the condition is satisfied, the training of the convolutional neural network is completed.

At operation S208, for the at least one face region image, an image corresponding to a first region and/or an image corresponding to a second region in the face region image are processed at least according to the face key point information in the face region image, where the image corresponding to the second region and the image corresponding to the first region are at least partially non-overlapping.

In this operation, the images in the face region image indicated by the first region and the second region may be determined according to requirements, for example, the first region may be configured to indicate a skin region of the face in the face region image, and the second region may be configured to indicate a region different from the first region in the face region image (for example, the second region may be configured to indicate a non-skin region of the face in the face region image, or the second region may be configured to indicate the non-skin region of the face in the face region image, as well as the regions other than the face such as the human's hair and ears in the face region image).

The first region and the second region in the face region image may be determined by means of an existing mode, for example, manual label division mode and pixel color information screening.

In an optional mode, the first region and the second region may be determined by means of a predetermined standard face template. For example, for each face region image, the predetermined standard face template may be obtained, where the standard face template includes standard face key point information; the standard face template is matched and deformed according to the face key point information in the face region image and the standard face key point information; and the first region and/or the second region in the face region image are determined at least according to the deformed standard face template. In the standard face template, different standard face key points may be labeled so that the standard face key points having the same label may form different regions. Therefore, after the standard face template is deformed, the face key points corresponding to the standard face template in the face region image may also have the same label as the standard face key points in the standard face template, to determine the first region and/or the second region in the face region image. Alternatively, in addition to the standard face key point information, the standard face template may further include a first predetermined region for indicating at least part of the skin region in the standard face, and a second predetermined region for indicating a non-skin region in the standard face. In this case, after the standard face template is deformed, the first region and the second region in the face region image may be determined according to the first predetermined region and the second predetermined region.

In another optional implementation mode, the determination of the first region and the second region may be determined according to the selection of the user. For example:

receiving region division information input by the user, and determining the image corresponding to the first region and/or the image corresponding to the second region in the face region image according to the region division information. For example, when determining the first region and the second region, the face region image may be provided to the user (the mode of provision may be displaying the face region image on a screen having a display function), so that the user can select a desired region (this region may be one continuous region or multiple separated regions) on the face region image as one of the first region and the second region, then use the remaining region as the other of the first region and the second region, and generate and receive the region division information according to the selection of the user.

In the present disclosure, the first region and the second region in the face region image may be determined according to the received region division information, thereby determining the image corresponding to the first region and the image corresponding to the second region. For example, the region selected by the user may be determined as the first region, and the region other than the region selected by the user may be determined as the second region.

In another optional implementation mode, the first region and the second region in the face region image are determined according to the face key point information in the face region image.

The determining the first region and the second region in the face region image according to the face key point information in the face region image is described in detail as follows.

At operation 1, a predetermined standard face template is obtained, where the standard face template includes standard face key point information, the standard face template may further include a first predetermined region for indicating at least part of the skin region in the standard face, and a second predetermined region for indicating the non-skin region in the standard face.

Figure 3:
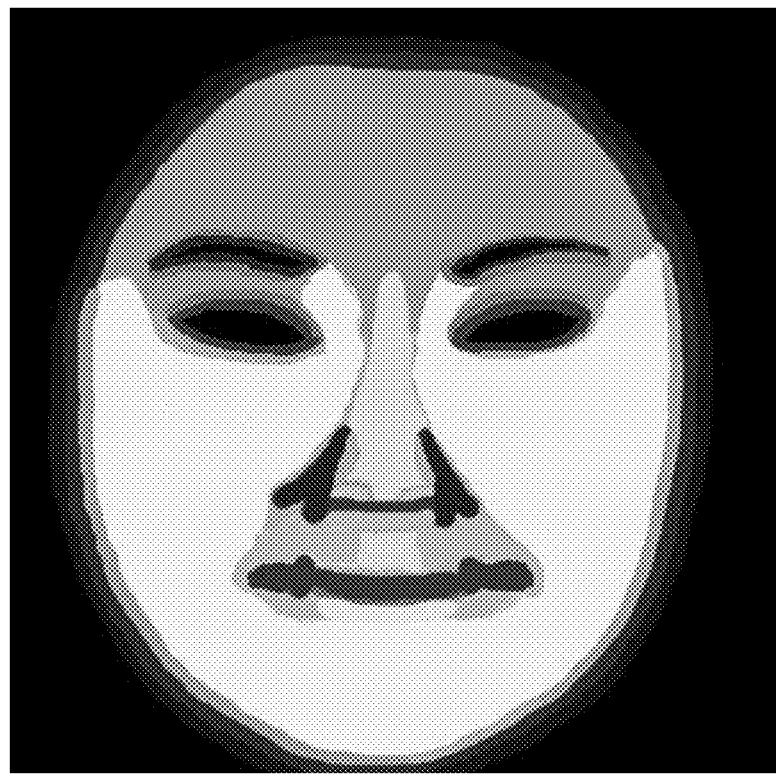
FIG. 3 is a schematic diagram of a standard face template in the embodiment shown in FIG. 2.

The standard face template (recorded as "standard face mask") is a predetermined template, which may include face key point labeling information. As shown in FIG. 3, FIG. 3 shows a standard face template. The standard face template may be obtained by means of, but not limited to, hand drawing, computer drawing, or the like. An optional implementation mode is to select one face image used as the standard face template, manually draw the standard face template, and mark the face key point labeling information in the standard face template. In the present disclosure, the first predetermined region indicating the skin region in the standard face may also be marked in the standard face template, and the skin region may include regions such as cheeks, forehead, and chin. In the present disclosure, the second predetermined region indicating the non-skin region in the standard face may also be marked in the standard face template, and the non-skin region may include eyes, eyebrow, mouth, and the like.

Multiple standard face templates may constitute a standard face template set, and each standard face template may include only a partial region of the face, and may also include the entire face. The information included in each standard face template may be different. Each standard face template may correspond to one processing.

At operation 2, the standard face template is matched and deformed according to the face key point information in the face region image and the standard face key point information.

Since the face size, the face shape, and the like of the standard face template may be different from the size and shape of the face in the face region image, it is necessary to deform the standard face template. The standard face template may be deformed by using an existing deformation method, as long as it may be ensured that the face key point in the deformed standard face template and the face key point in the face region image are as close as possible to each other in distance or are aligned (as long as the distance between the two satisfies a set threshold, the two are considered to be aligned).

At Operation 3, the first region and/or the second region in the face region image are determined at least according to the first predetermined region and the second predetermined region in the deformed standard face template.

The face size, the face shape and the like of the deformed standard face template are consistent with the shape and size of the face in the face region image, and therefore, the first region and the second region in the face region image may be determined according to the first predetermined region and the second predetermined region in the deformed standard face template. The specific process thereof may include operations 1) to 4).

At operation 1), a region, in the face region image, corresponding to the first predetermined region in the deformed standard face template is determined as a first initial region.

The portions in the deformed standard face template should correspond to the portions of the face in the face region image. For example, the cheek of the face in the deformed standard face template corresponds to the cheek of the face in the face region image, and therefore, the region, in the face region image, corresponding to the first predetermined region in the deformed standard face template may be determined as the first initial region.

At operation 2), non-skin pixels in an image corresponding to the first initial region are screened and excluded.

Due to the uncertainty of the morphology of the face in the face region image, for example, the posture and expression of the face, the hairstyle, whether glasses is worn, whether a mask is worn, etc., after the first initial region is determined, it is also necessary to screen and exclude the region indicated by the first initial region, so as to exclude non-skin pixels in the first initial region. The process of excluding the non-skin pixels in the first initial region may be as follows:

pixel information of each pixel of the image corresponding to the first initial region (the pixel information includes, but is not limited to, color information) is obtained, and it may be determined which pixels are the non-skin pixels according to the color information in the pixel information (pixels with color values outside some set thresholds are the non-skin pixels, for example, the difference between the color information of the hair, eye frame, etc. on the forehead and the color information of the skin is great). After the non-skin pixels are determined, these non-skin pixels are identified (for example, the color values of the non-skin pixels are zeroed to make them appear black), so as to screen and exclude the non-skin pixels from the first initial region.

At operation 3), a region, in the first initial region, from which the pixels for indicating the non-skin are screened and excluded, is determined as the first region. That is, the region, in the first initial region, from which the pixels for indicating the non-skin are screened and excluded, is the first region in the face region image.

At operation 4), a region, in the face region image, corresponding to the second predetermined region in the deformed standard face template, and a portion screened and excluded in the first initial region are determined as the second region. For example, a region other than the first region in the face region image is the second region. Specifically, the second region includes a region corresponding to the second predetermined region of the deformed standard face template, and the region screened and excluded in the first initial region.

After the first region and the second region in the face region image are determined, the image corresponding to the first region and the image corresponding to the second region may be determined, and the image corresponding to the first region and the image corresponding to the second region may be processed.

In other embodiments, determining the first region and the second region in the face region image may further include the following operations (1) to (3).

At operation (1), a predetermined standard face template is obtained, where the standard face template includes standard face key point information. This operation is the same as the corresponding operation in the previous mode, and the details are not described here again.

At operation (2), the face region image is deformed according to the face key point information in the face region image and the standard face template.

In this operation, the face region image is deformed according to the face key point information, so that the face key point in the face region image and the face key point in the standard face template are as close as possible to each other or are aligned (as long as the distance between the two satisfies a set threshold, the two are considered to be aligned). After the face region image is deformed, the face size and the face shape of the deformed face region image are basically consistent with the face size and the face shape of the standard face template.

At operation (3), the first region and the second region in the deformed face region image are determined according to the first predetermined region and the second predetermined region in the standard face template.

After the first region and the second region in the deformed face region image are determined, the image corresponding to the first region and the image corresponding to the second region may be processed. It should be noted that since the face region image is deformed, after the processing of the deformed face region image is completed, the processed deformed face region image may be necessary to be inversely deformed so as to be consistent with the face region image before the deformation in size and shape.

The processing the image corresponding to the first region and/or the image corresponding to the second region in the face region image includes:

performing, for each face region image, different processing on the image corresponding to the first region and/or the image corresponding to the second region in the face region image according to different processing requirements.

For each face region image, the user may have multiple processing requirements, such as beautification, cartoonization, artification, makeup, and entertainment. When performing beautification, it may be necessary to perform processing such as smoothing, eye enlargement, and lip reddening. When performing cartoonization, it may be necessary to perform processing such as partial enlargement and distortion of the five sense organs. When performing artification, it may be necessary to perform processing such as picture making old.

Taking beautification as an example, the user may select which processing is performed on the face region image, such as smoothing, whitening, reddening, eye enlargement, and the like. Default processing may also be set by means of the system.

In the embodiments, the processing of the face region image includes at least one of: face-thinning, eye enlargement, eye enhancement, face smoothing, lip reddening/lip smoothing, dark eye circle removal/under-eye puffiness removal, face whitening/face reddening, or acne removal/nevus removal/freckle removal. "/" in the lip reddening/lip smoothing, dark eye circle removal/under-eye puffiness removal, face whitening/face reddening, or acne removal/nevus removal/freckle removal indicates "and/or", that is, the lip reddening/lip smoothing should be understood as "lip reddening and/or smoothing".

The following describes the processing of the face region image for each of the above processing:

1. Face Smoothing Processing is Performed

When performing the face smoothing processing, the processing the image corresponding to the first region and/or the image corresponding to the second region at least according to the deformed standard face template includes operations a1 to c1.

At operation a1, the image corresponding to the first region and the image corresponding to the second region in the face region image ("FaceReg") are blurred to obtain a blurred face region image (recorded as "BluredFaceReg").

The blurring processing may perform Gaussian blurring processing only, or may perform median blurring processing only, or may perform both Gaussian blurring processing and median blurring processing.

If the Gaussian blurring processing and the median blurring processing are simultaneously performed, when generating the blurred face region image, the maximum value of each corresponding pixel in the face region image subjected to the Gaussian blurring processing and the face region image subjected to the median blurring processing is taken as a pixel at the corresponding position of the generated blurred image region image ("BluredFaceReg"), In this process, since the image corresponding to the first region and the image corresponding to the second region in the face region image are processed, and when performing smoothing, a portion of the face region image (for example, the non-skin region image indicated by the second region) does not need the smoothing processing, in order to avoid the unnaturalness of the processed image caused by the smoothing processing on the entire face, the following processing is performed on the blurred face region image to ensure the processed image to be more natural while ensuring the beautification effect.

At operation b1, the deformed face region image (recorded as "warpmask") is generated according to the deformed standard face template (the acquisition mode of the deformed standard face template has been explained above, and the details are not be described here again) and the face region image ("FaceReg").

Each pixel in the deformed face region image is determined according to pixel information of the first predetermined region and the pixel information of the second predetermined region marked in the standard face template. For example, as shown in FIG. 3, in FIG. 3, the black portion in the standard face template represents the second predetermined region (the non-skin region, the region on which the smoothing processing is not performed), and the pixel information of the region, in the deformed face region image, corresponding to the second predetermined region is determined according to the pixel information of the second predetermined region. Thus, the details of the parts such as eyebrows, eyes, lip, and nasal fossa are retained. The region other than black represents the first predetermined region (the skin region, the region on which the smoothing processing needs to be performed).

In an optional mode, multi-level subdivision may further be performed on the region needing smoothing, such as multiple different levels of white, the whiter the greater the smoothing strength.

In order to make the edge of the deformed face region image smooth and naturally transitional, guided filtering ("guidedfilter") may be performed on the deformed face region image ("warpmask") by means of the face region image ("FaceReg"), so as to generate a smooth deformed face region image (recorded as "smoothwarpedmask").

At operation c1, a smoothed face region image is generated according to the deformed face region image, the blurred face region image, and the face region image. Since the deformed face region image ("warpmask") has distinguished the region needing smoothing and the region not needing smoothing in the face region image ("FaceReg"), the blurred face region image ("BluredFaceReg") may be adjusted using the deformed face region image ("warpmask"), so as to make the smoothed image more natural.

An one optional mode, the smoothed face region image (recorded as "smoothFaceReg") may be generated according to the deformed face region image ("warpmask", if the guided filtering is performed, the deformed face region image is "smoothwarpedmask"), the blurred face region image ("BluredFaceReg"), and the face region image ("FaceReg").

For example, the smoothed face region image (recorded as "smoothFaceReg") is generated according to the following formula 8.

smoothFaceReg=smoothwarpedmask*BluredFaceReg± (1.0−smoothwarpedmask)*FaceReg (formula 8)

In order to further improve the edge smoothness of the generated smoothed face region image and make the transition more natural, the guided filtering ("guidedfilter") is performed on the face region image ("FaceReg") by using the smoothed face region image ("smoothFaceReg") to generate a smooth smoothed face region image (recorded as "guidedsmoothFaceReg").

The smooth smoothed face region image ("guidedsmoothFaceReg") is then placed back into the original image (the face region image) and the strength is controlled by means of "AlphaBlending". The optional strength control formula is:

FaceReg=alpha*guidedsmoothFaceReg−(1.0−alpha)* FaceReg (formula 9)

where, the value of "alpha" ranges from 0.0 to 1.0, and is used for controlling the smoothing strength.

II. Lip Reddening/Lip Smoothing Processing is Performed

When the determined processing includes lip reddening/lip smoothing processing, the image corresponding to the second region includes a lip image; the processing the image corresponding to the first region and/or the image corresponding to the second region at least according to the deformed standard face template includes operations a2 to c2.

At operation a2, the lip image is reddened and/or blurred to obtain a reddened and/or blurred lip image.

The mode of determining the second region in the face region image has been described above, and the details are described herein again. It should be noted that: the lip image included in the image corresponding to the second region may be selected from the face region image according to the face key point information, and the lip image is recorded as "FaceReg" when the lip reddening/lip smoothing processing is performed.

The specific reddening and/or blurring processing may be: performing reddening processing, Gaussian blurring, and/or median blurring on the lip image ("FaceReg"), and generating a reddened and/or blurred lip image (recorded as "smoothFaceReg").

At operation b2, a deformed lip image is generated according to the lip image and the deformed standard face template.

The mode of obtaining the deformed standard face template has been described above, and the details are described herein again. It should be noted that: the standard face template may be a standard face template corresponding to lip reddening/lip smoothing processing obtained from a standard face template set. The standard face template may include only an image of the lip and a surrounding region to be processed by the lip reddening/lip smoothing processing, and may also include an image of the entire face.

The process of generating the deformed lip image ("warpmask") according to the deformed standard face template and the lip image is the same as the process of generating a deformed face region image according to the face region image and the deformed standard face template in the smoothing processing. The strength of the processing of the lip image is indicated in the pixel information of the deformed lip image. Guided filtering may also be performed on the deformed standard face template in this process to make edges smoother and generate a smooth deformed lip image (recorded as "smoothwarpmask").

At operation c2, a final lip image is generated according to the deformed lip image ("warpmask" and "smoothwarpmask", the reddened and/or blurred lip image ("smoothFaceReg"), and the lip image ("FaceReg").

The process of generating the final lip image according to the deformed lip image, the reddened and/or blurred lip image, and the lip image is similar to the process of generating the smoothed face region image according to the deformed face region image, the blurred face region image, and the face region image, and the details are not described here again.

The final lip image is then put into the face region image by means of AlphaBlending.

"AlphaBlending" is also referred to as "a blending". AlphaBlending is an image processing technique of mixing source and target pixels according to the value of an "Alpha" blending vector. The Alpha blending vector generally represents the transparency of the image.

Taking the a blending of two pixels as an example:

First, the RGB three color components of the source and target pixels are separated. Then, the three color components of the source pixel are separately multiplied by the value of Alpha, and the three color components of the target pixel are separately multiplied by the inverse value of Alpha. Next, the results are added according to the corresponding color components to obtain each finally calculated component result. Finally, the three color components are recombined into one pixel output.

III. The Processing is Dark Eye Circle Removal/Under-Eye Puffiness Removal Processing When the processing includes the dark eye circle removal/under-eye puffiness removal processing, the image corresponding to the second region includes an under-eye set region image; the processing the image corresponding to the first region and/or the image corresponding to the second region at least according to the deformed standard face template includes operations a3 to d3.

At operation a3, the under-eye set region image is blurred.

The mode of determining the second region in the face region image has been described above, and the details are described herein again. It should be noted that the image corresponding to the second region includes the under-eye set region image. The under-eye set region image may be selected from the face region image according to the face key point information. When the dark eye circle removal/under-eye puffiness removal processing is performed, the under-eye set region image is recorded as "FaceReg". An under-eye set region may be appropriately set by persons skilled in the art according to actual situations, and may be set based on the size of a region where dark eye circles and/or under-eye puffiness may exist.

Specifically, blurring the under-eye set region image may be: performing Gaussian blurring and/or median blurring on the under-eye set region image, and generating a blurred under-eye set region image (referred to as "smoothFaceReg").

At operation b3, color migration is performed on the blurred under-eye set region image.

Color migration is performed on the blurred under-eye set region image, and an under-eye set region image after the color migration of the face is generated. The specification process of performing color migration to the blurred under-eye set region image includes: converting the blurred under-eye set region image to a YUV color space, and calculating the mean and variance of the under-eye set region (i.e., a dark eye circle and/or under-eye puffiness region) and the skin below, and then the color migration is performed.

At operation c3, a deformed under-eye set region image is generated according to the under-eye set region image and the deformed standard face template.

The standard face template in this process is a face standard template correspondingly having dark eye circle removal/under-eye puffiness removal processing selected from the standard face template set. The process of generating the deformed under-eye set region image according to the under-eye set region image and the deformed standard face template is the same as the process of generating a deformed face region image according to the face region image and the deformed standard face template in the smoothing process, and the details are not described here again.

Guided filtering may also be performed on the deformed standard face template in this process to make the edges smoother and generate a smooth deformed under-eye set region image (recorded as "smoothwarpmask").

At operation d3, a final under-eye set region image is generated according to the deformed under-eye set region image, the under-eye set region image after the color migration, and the under-eye set region image.

The processing of generating the final under-eye set region image is generated according to the deformed under-eye set region image, the under-eye set region image after the color migration, and the under-eye set region image is similar to the process of generating the smoothed face region image according to the deformed face region image, the blurred face region image, and the face region image, and the details are not described here again. The final under-eye set region image is the under-eye set region image after the dark eye circle removal/under-eye puffiness removal.

Then, the under-eye set region image after the dark eye circle removal/under-eye puffiness removal is put into the face region image by means of AlphaBlending.

IV. The Processing is Acne Removal/Nevus Removal/Freckle Removal Processing

When the determined processing includes the acne removal/nevus removal/freckle removal processing, the processing the image corresponding to the first region and/or the image corresponding to the second region in the face region image includes operations a4 to b4.

At operation a4, an acne/nevus/freckle region in the first region is determined. In one embodiment, the face region image is converted to a gradient map, and a Blobmask is generated by means of Blobdetect. In addition, deformation and guided filtering are performed on the face standard template to generate the deformed face standard template (guidedwarpedmask). The Blobmask is screened using the deformed face standard template, and then skin color screening is performed, a glasses mask is segmented for screening, and a connected region (connectedcomponent) is screened to determine the locations of acnes and/or nevi and/or freckles.

At operation b4, repairing processing is performed on an image corresponding to the acne/nevus/freckle region in the image corresponding to the first region.

In one embodiment, performing repairing processing on the image corresponding to the acne/nevus/freckle region includes performing smoothing processing on the face region image, for example, performing Gaussian blurring and/or median blurring. The image after the connectedcomponent screening and the image after the smoothing processing are combined to generate an image after acne removal and/or nevus removal and/or freckle removal.

The face region image after the acne removal and the nevus removal is put into the original face region image by means of AlphaBlending.

V. The Processing is Face Whitening/Face Reddening Processing

When the determined processing includes the face whitening/face reddening processing, the processing the image corresponding to the first region and/or the image corresponding to the second region at least according to the face region image and a deformed face region image includes operations a5 to b5.

At operation a5, the image corresponding to the first region and/or the image corresponding to the second region are whitened and/or reddened, and a whitened and/or reddened face region image is generated.

Whitening the image corresponding to the first region and the image corresponding to the second region includes: stretching the brightness of the face region image through a segmentation curve, enhancing the exposure at low light, suppressing the exposure at the high light, and improving the brightness of the image corresponding to the first region and the image corresponding to the second region.

Certainly, in other embodiments, it is also possible to only whiten the image corresponding to the first region (the image of the skin region).

At operation b5, a final face region image is generated according to the face region image, the deformed face region image, and the whitened and/or reddened face region image.

This process is similar to the process of generating the smoothed face region image according to the deformed face region image, the blurred face region image, and the face region image, and the details are not described here again.

Then, the final face region image is put into the original face region image by means of AlphaBlending.

VI. The Processing is Eye Enhancement Processing

When the determined processing includes the eye enhancement processing, the processing the image corresponding to the first region and/or the image corresponding to the second region in the face region image includes operations a6 to b6.

At operation a6, an eye region in the second region is determined.

The mode of determining the eye region in the second region may be determining the eye region according to the face key point information. Then, the eye region is extracted from the face region image.

At operation b6, enlargement processing is performed on an image corresponding to the eye region in the face region image.

In one embodiment, contrast enhancement processing is performed on the eyes in image of the extracted eye region.

The enhanced eye region image is combined with the extracted eye region image by means of AlphaBlending, and USM (Unsharp Mask) sharpening is performed on the combined image, and then the sharpened eye region image is restored into the face region image.

VII. The Processing is Eye Enlargement Processing

When the determined processing includes the eye enlargement processing, the processing the image corresponding to the first region and/or the image corresponding to the second region in the face region image includes operations a7 to b7.

At operation a7, an eye region in the second region is determined.

The mode of determining the eye region in the second region may be determining the eye region according to the face key point information. Then, the eye region is extracted from the face region image.

At operation b7, enlargement processing is performed on an image corresponding to the eye region in the face region image.

Figure 4:
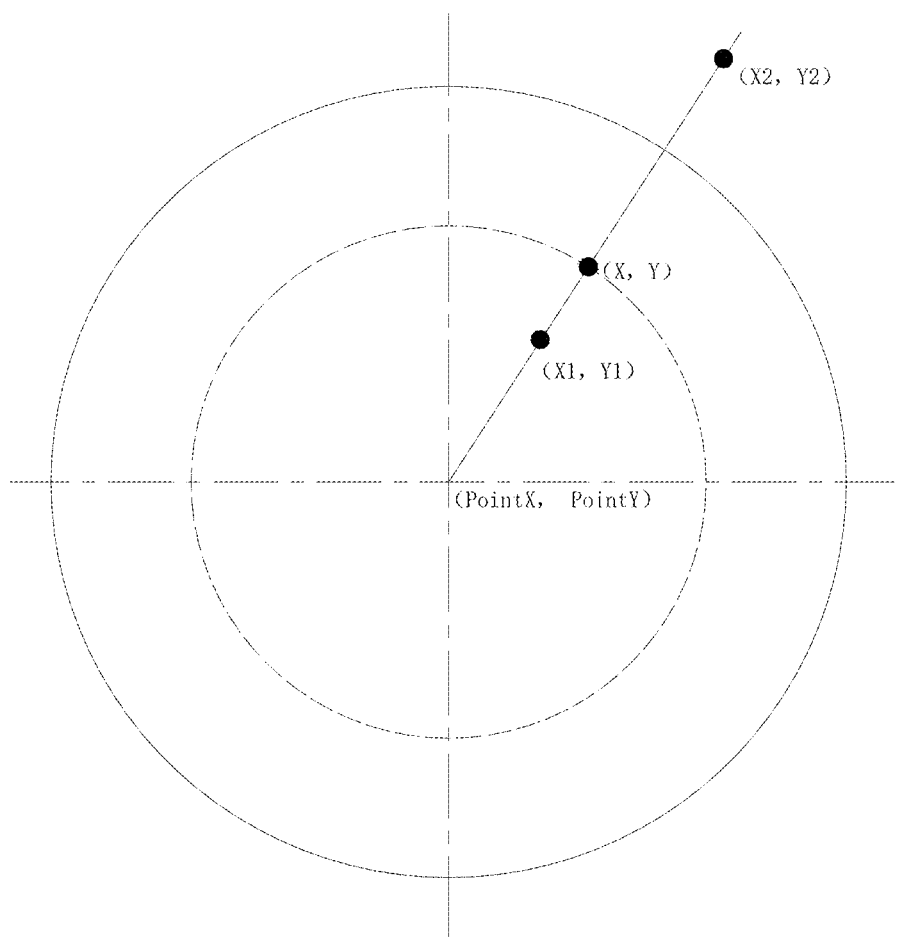
FIG. 4 is a schematic diagram of an eye enlargement principle in the embodiment shown in FIG. 2.

In one embodiment, performing enlargement processing includes:

The key point information of the left eye and/or the right eye in the face region image is determined according to the face key point information, and the enlargement processing is performed on the eyes according to an enlargement principle. The enlargement principle includes: as shown in FIG. 4, let the eye region be a circular region centered on (pointX, pointY) and using Radius as the radius, for any pixel (x, y), and a position pixel is selected, according to the ratio of the position of the pixel to the radius, from a line passing through the points (pointX, pointY) and (x, y) as the new pixel value of the point. If this new position is between two points (such as x1 and y1 in FIG. 4), the eye reduction effect occurs, and if the new position is on the extension line of the line connecting two points (such as x2 and Y2 in FIG. 4), an enlargement phenomenon occurs.

In order to reduce the blurring of the eye edges after enlargement, the pixel value of the position after mapping is optimized using a bilinear interpolation method. The calculation formula of linear mapping is adjusted such that the smaller the change of becoming closer of the eyeballs, the larger the charge of becoming farther.

VIII. The Processing is Face-Thinning Processing

When the determined processing includes the face-thinning processing, the processing the image corresponding to the first region and/or the image corresponding to the second region in the face region image includes:

Face contour part key points are moved inward according to face contour part key point information in the face key point information, to obtain new key points. Circular region centered on the key points are deformed one by one according to a graph local transformation principle, and the pixel value of the new position is reduced by means of bilinear interpolation.

Figure 5:
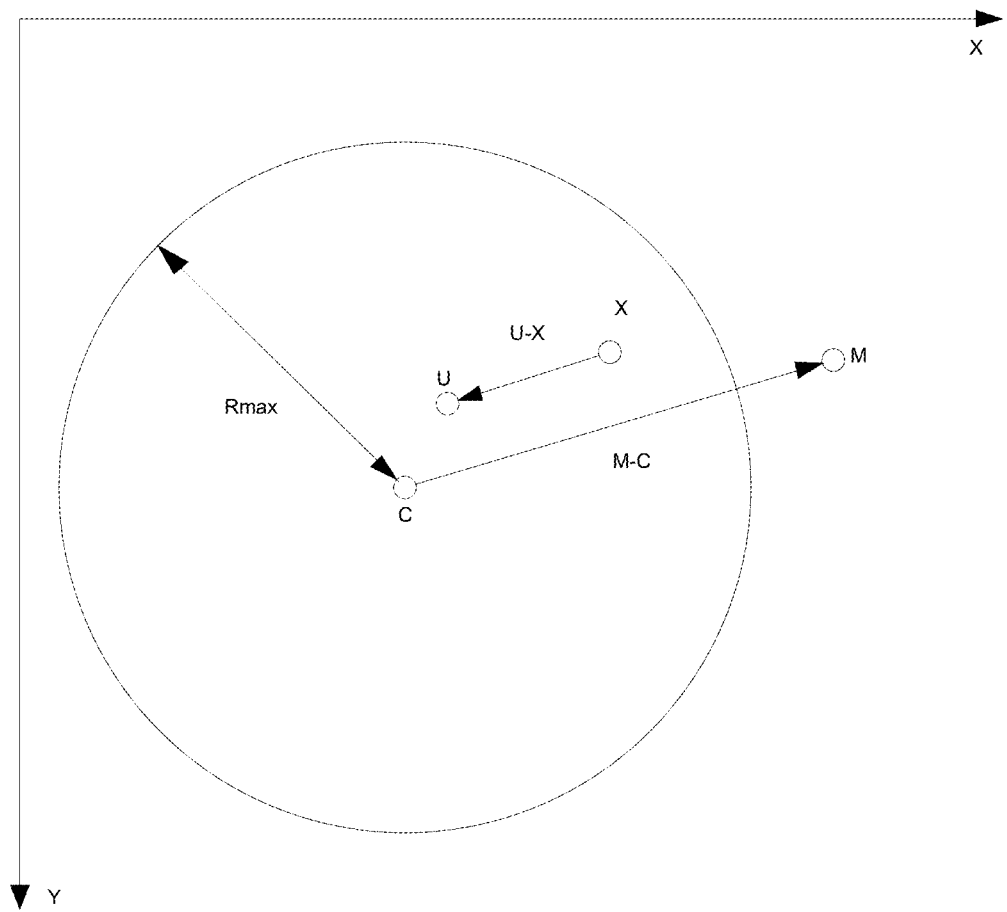
FIG. 5 is a schematic diagram of a face-thinning principle in the embodiment shown in FIG. 2.

The graph local transformation principle includes: as shown in FIG. 5, the circle in FIG. 5 represents a circular selection region having a radius of $r_{max}$. Where, point C is the center of the current circular selection region. The center is moved from C to M, so that point U in the image is transformed to point X. When the inverse transformation of this transformation is known, and when point X is given, the coordinate U (a precise floating point coordinate) before the transformation can be calculated. By calculating the value of each pixel in the circular selection region as such, the image after the transformation can be obtained.

The inverse transformation formula is:

$$\vec{u} = \vec{x} - \left( \frac{r_{max}^2 - |\vec{x} - \vec{c}|^2}{(r_{max}^2 - |\vec{x} - \vec{c}|^2) + |\vec{m} - \vec{c}|^2} \right)^2 (\vec{m} - \vec{c}) \quad \text{(Formula 10)}$$

where, $\vec{u}$ represents a transformation vector at coordinate U. $\vec{x}$ represents a transformation vector at coordinate X.

$\vec{m}$ represents a transformation vector at coordinate M. $r_{max}$ represents the radius of the circle. $\vec{c}$ represents a transformation vector at coordinate c.

With this embodiment, the face detection is performed to support processing of a single or multiple faces. Combining the face key point positioning technology with the standard face template is beneficial to achieve accurate differentiation processing of different regions of the face, and is beneficial to ensure the intactness and sharpness of the eyebrows, eyes, hair and other details while accurately performing desired processing on the skin region of the face, and thus is beneficial to improving the face processing effect, and is beneficial to enable the processed image to remain natural.

The face image processing method in the embodiments may be performed by any appropriate device having image or data processing capability, including, but not limited to, a mobile terminal, a Personal Computer (PC), a server, a vehicle-mounted device, an entertainment device, an advertisement device, or the like.

Figure 6:
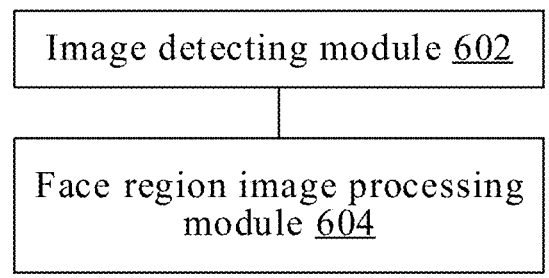
FIG. 6 is a structural block diagram of a face image processing apparatus according to an embodiment of the present disclosure.

Referring to FIG. 6, a structural block diagram of a face image processing apparatus according to an embodiment of the present disclosure is shown.

The face image processing apparatus in the embodiments includes: an image detecting module 602, configured to perform face detection on a to-be-processed image, to obtain at least one face region image included in the to-be-processed image and face key point information in the at least one face region image; and a face region image processing module 604, configured to process, for the at least one face region image, an image corresponding to a first region and/or an image corresponding to a second region in the face region image at least according to the face key point information in the face region image, where the image corresponding to the second region and the image corresponding to the first region are at least partially non-overlapping.

The face image processing apparatus of this embodiment is configured to implement the corresponding face image processing method in the forgoing multiple method embodiments, and has the beneficial effects of the corresponding method embodiments. The details are not described here again.

Figure 7:
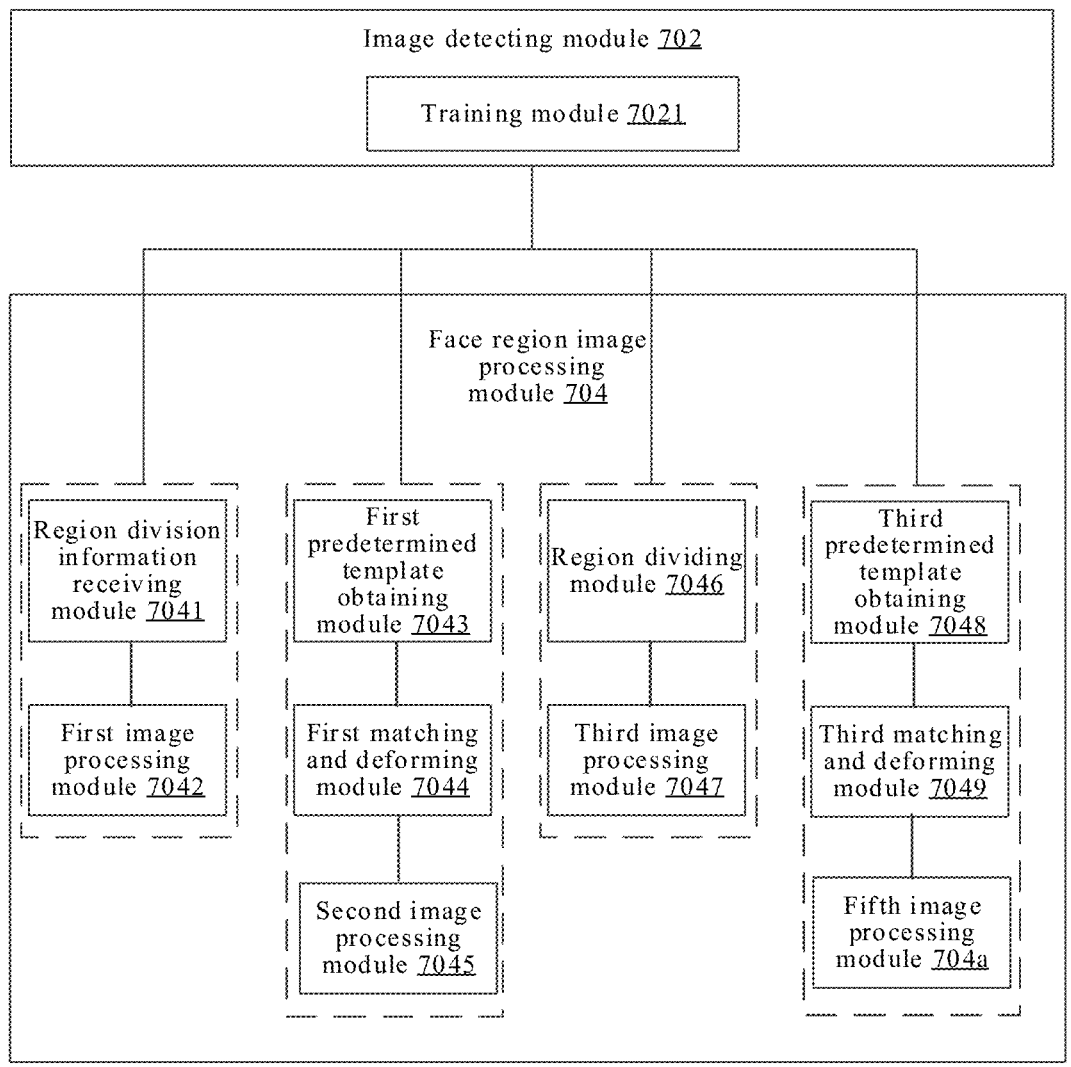
FIG. 7 is a structural block diagram of another face image processing apparatus according to an embodiment of the present disclosure.

Referring to FIG. 7, a structural block diagram of a face image processing apparatus according to an embodiment of the present disclosure is shown.

The face image processing apparatus In the embodiments includes: an image detecting module 702, configured to perform face detection on a to-be-processed image, to obtain at least one face region image included in the to-be-processed image and face key point information in the at least one face region image; and a face region image processing module 704, configured to process, for the at least one face region image, an image corresponding to a first region and/or an image corresponding to a second region in the face region image at least according to the face key point information in the face region image, where the image corresponding to the second region and the image corresponding to the first region are at least partially non-overlapping.

According to one or more embodiments of the present disclosure, the face region image processing module 704 includes: a region division information receiving module 7041, configured to receive region division information input by a user, and determine the image corresponding to the first region and/or the image corresponding to the second region in the face region image according to the region division information; and a first image processing module 7042, configured to process the image corresponding to the first region and/or the image corresponding to the second region in the face region image at least according to the face key point information in the face region image.

According to one or more embodiments of the present disclosure, the face region image processing module 704 includes: a first predetermined template obtaining module 7043, configured to obtain a predetermined standard face template, the standard face template including standard face key point information; a first matching and deforming module 7044, configured to match and deform the standard face template according to the face key point information in the face region image and the standard face key point information; and a second image processing module 7045, configured to process the image corresponding to the first region and/or the image corresponding to the second region at least according to the deformed standard face template.

According to one or more embodiments of the present disclosure, the face region image processing module 704 includes: a region dividing module 7046, configured to determine the first region and/or the second region in the face region image at least according to the face key point information in the face region image; and a third image processing module 7047, configured to process the image corresponding to the first region and/or the image corresponding to the second region in the face region image.

According to one or more embodiments of the present disclosure, the third image processing module 7047 includes: a second predetermined template obtaining module (not shown), configured to obtain a predetermined standard face template, where the standard face template includes standard face key point information, a first predetermined region for indicating at least part of a skin region in a standard face, and a second predetermined region for indicating a region different from the first predetermined region in the standard face; a second matching and deforming module (not shown), configured to match and deform the standard face template according to the face key point information in the face region image and the standard face key point information; and a fourth image processing module (not shown), configured to determine the first region and/or the second region in the face region image at least according to the first predetermined region and/or the second predetermined region in the deformed standard face template.

According to one or more embodiments of the present disclosure, the second predetermined region is configured to indicate a non-skin region in the standard face.

According to one or more embodiments of the present disclosure, the fourth image processing module includes: a first initial region determining module (not shown), configured to determine a region, in the face region image, corresponding to the first predetermined region in the deformed standard face template as a first initial region; a screen-out module (not shown), configured to screen and exclude non-skin pixels in an image corresponding to the first initial region; a first region determining module (not shown), configured to determine a region, in the first initial region, from which the non-skin pixels are screened and excluded, as the first region; and a second region determining module (not shown), configured to determine a region, in the face region image, corresponding to the second predetermined region in the deformed standard face template, and a portion screened and excluded in the first initial region as the second region.

According to one or more embodiments of the present disclosure, the face region image processing module 704 includes: a third predetermined template obtaining module 7048, configured to obtain a predetermined standard face template, the standard face template including standard face key point information; a third matching and deforming module 7049, configured to deform the face region image according to the face key point information in the face region image and the standard face template; and a fifth image processing module 704a, configured to process the image corresponding to the first region and/or the image corresponding to the second region at least according to the face region image and the deformed face region image.

According to one or more embodiments of the present disclosure, when obtaining the predetermined standard face template, the first predetermined template obtaining module 7043, the second predetermined template obtaining module (not shown) or the third predetermined template obtaining module 7048 determines a standard face template required for current image processing from at least two different standard face templates included in a predetermined standard face template set.

According to one or more embodiments of the present disclosure, the processing performed by the face region image processing module 704 on the image corresponding to the first region and/or the image corresponding to the second region in the face region image includes: at least one of face-thinning, eye enlargement, eye enhancement, face smoothing, lip reddening/lip smoothing, dark eye circle removal/under-eye puffiness removal, face whitening/face reddening, or acne removal/nevus removal/freckle removal.

According to one or more embodiments of the present disclosure, the second image processing module 7045 includes: a blurring processing module (not shown), configured to blur the image corresponding to the first region and/or the image corresponding to the second region to obtain a blurred face region image; a deformed face region image generating module (not shown), configured to generate a deformed face region image according to the face region image and the deformed standard face template; and a smoothed face region image generating module (not shown), configured to generate a smoothed face region image according to the deformed face region image, the blurred face region image, and the face region image.

According to one or more embodiments of the present disclosure, the image corresponding to the second region includes a lip image; and the second image processing module 7045 includes: a lip processing module (not shown), configured to redden and/or blur the lip image to obtain a reddened and/or blurred lip image; a deformed lip image generating module (not shown), configured to generate a deformed lip image according to the lip image and the deformed standard face template; and a final lip image generating module (not shown), configured to generate a final lip image according to the deformed lip image, the reddened and/or blurred lip image, and the lip image.

According to one or more embodiments of the present disclosure, the image corresponding to the second region includes an under-eye set region image; and the second image processing module 7045 includes: an under-eye processing module (not shown), configured to blur the under-eye set region image; a color migrating module (not shown), configured to perform color migration on a blurred under-eye set region image; a deformed under-eye set region image generating module, configured to generate a deformed under-eye set region image according to the under-eye set region image and the deformed standard face template; and a final under-eye set region image generating module (not shown), configured to generate a final under-eye set region image according to the deformed under-eye set region image, the under-eye set region image after the color migration, and the under-eye set region image.

According to one or more embodiments of the present disclosure, the fifth image processing module 704a includes: a whitened and/or reddened face region image generating module (not shown), configured to whiten and/or redden the image corresponding to the first region and/or the image corresponding to the second region, and generate a whitened and/or reddened face region image; and a final face region image generating module (not shown), configured to generate a final face region image according to the face region image, the deformed face region image, the whitened and/or reddened face region image.

According to one or more embodiments of the present disclosure, the third image processing module includes 7047: an acne/nevus/freckle region determining module (not shown), configured to determine an acne/nevus/freckle region in the first region; and a repairing module (not shown), configured to perform repairing processing on an image corresponding to the acne/nevus/freckle region in the image corresponding to the first region.

According to one or more embodiments of the present disclosure, the third image processing module includes: an eye region determining module (not shown), configured to determine an eye region in the second region; and an enlargement processing module (not shown), configured to perform enlargement processing on an image corresponding to the eye region in the face region image.

According to one or more embodiments of the present disclosure, the image detecting module 702 performs image detection on the to-be-processed image by means of a pre-trained neural network to obtain at least one face region image included in the to-be-processed image and face key point information in the at least one face region image.

According to one or more embodiments of the present disclosure, the image detecting module 702 includes a training module 7021, configured to train the neural network; and the training module 7021 includes: a scrambling module (not shown), configured to obtain, by performing at least information retention scrambling processing on an original sample image including face feature point labeling information, a scrambled sample image and image information subjected to the information retention scrambling processing; a detecting module (not shown), configured to detect the original sample image and the scrambled sample image based on the neural network, to obtain first prediction information for face feature points in the original sample image and second prediction information for face feature points in the scrambled sample image; a determining module (not shown), configured to determine a first difference between the first prediction information and the labeling information, a second difference between the first prediction information and the second prediction information, and a third difference between the second difference and the image information subjected to the information retention scrambling processing; and an adjusting module (not shown), configured to adjust network parameters of the neural network according to the first difference and the third difference.

According to one or more embodiments of the present disclosure, the scrambling module (not shown) is further configured to perform information retention scrambling processing and information non-retention scrambling processing on the original sample image including the face feature point labeling information, to obtain the scrambled sample image and the image information subjected to the information retention scrambling processing.

According to one or more embodiments of the present disclosure, the determining module (not shown) includes: a first difference determining module, configured to determine the first difference between the first prediction information and the face feature point labeling information in the original sample image by using a first loss function, where the first loss function is used for measuring the accuracy of a face feature point prediction result in the original sample image.

According to one or more embodiments of the present disclosure, the determining module includes: a second difference determining module (not shown), configured to determine the second difference between the first prediction information and the second prediction information by using a second loss function, where the second loss function is used for measuring a difference between the face feature point prediction result in the original sample image and a face feature point prediction result in the scrambled sample image.

According to one or more embodiments of the present disclosure, the second difference determining module is further configured to obtain a distance between the first prediction information and the second prediction information by means of a first distance calculation function. The distance is the second difference.

According to one or more embodiments of the present disclosure, the determining module includes: a third difference determining module (not shown), configured to obtain, by means of a second distance calculation function, a distance between the second difference and the image information subjected to the information retention scrambling processing. The distance is the third difference.

According to one or more embodiments of the present disclosure, the information retention scrambling processing includes at least one of: affine transformation processing, translation processing, scaling processing, or rotation processing.

The face image processing apparatus of this embodiment is configured to implement the corresponding face image processing method in the forgoing multiple method embodiments, and has the beneficial effects of the corresponding method embodiments. The details are not described here again.

Figure 8:
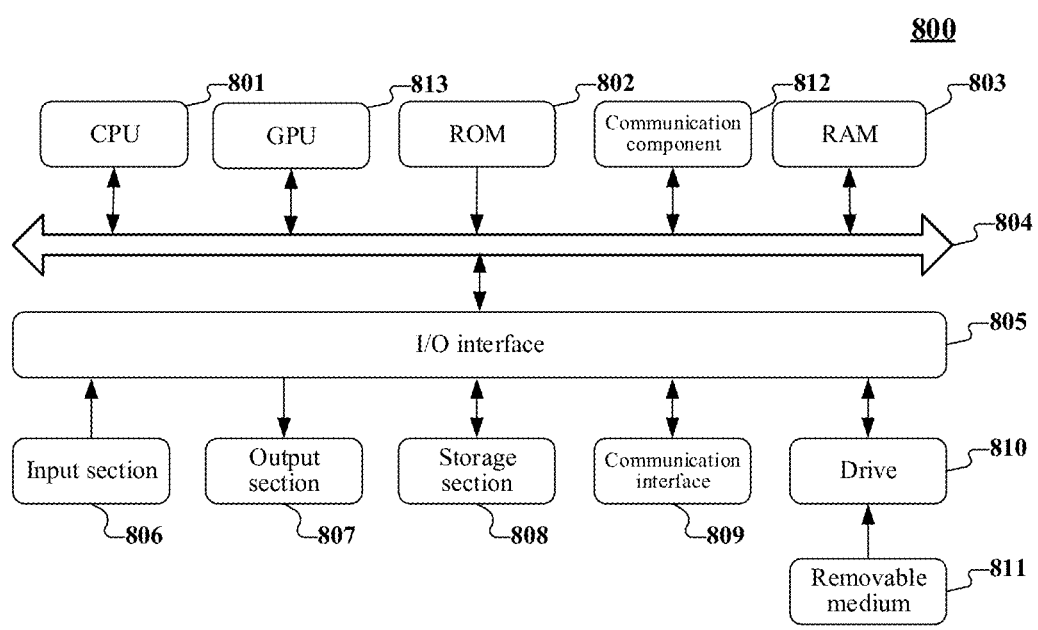
FIG. 8 is a schematic structural diagram of an electronic device according to an embodiment of the present disclosure.

Referring to FIG. 8, a schematic structural diagram of an electronic device according to an embodiment of the present disclosure is shown. Embodiment 5 of the present disclosure provides an electronic device, which, for example, may be a mobile terminal, a Personal Computer (PC), a tablet computer, a server, or the like. Referring to FIG. 8 below, a schematic structural diagram of an electronic device 800, which may be a terminal device or a server, suitable for implementing the embodiments of the present disclosure is shown. As shown in FIG. 8, the electronic device 800 includes one or more processors, a communication element, or the like. The one or more processors are, for example, one or more Central Processing Units (CPUs) 801 and/or one or more Graphic Processing Units (GPUs) 813, and may execute appropriate actions and processing according to executable instructions stored in a Read-Only Memory (ROM) 802 or executable instructions loaded from a storage section 808 to a Random Access Memory (RAM) 803. The communication element includes a communication component 812 and/or a communication interface 809. The communication component 812 may include, but is not limited to, a network card. The network card may include, but is not limited to, an InfiniBand (IB) network card. The communication interface 809 includes a communication interface of a network interface card such as an LAN card and a modem, and the communication interface 809 performs communication processing via a network such as the Internet.

The processor may communicate with the ROM 802 and/or the RAM 803, to execute executable instructions. The processor is connected to the communication component 812 via a bus 804, and communicates with other target devices via the communication component 812, thereby implementing corresponding operations of any face image processing method provided in the embodiments of the present disclosure, for example, performing face detection on a to-be-processed image, to obtain at least one face region image included in the to-be-processed image and face key point information in the at least one face region image; and processing, for the at least one face region image, an image corresponding to a first region and/or an image corresponding to a second region in the face region image at least according to the face key point information in the face region image, where the image corresponding to the second region and the image corresponding to the first region are at least partially non-overlapping.

In addition, the RAM 803 further stores programs and data required for operations of an apparatus. The CPU 801 or GPU 813, the ROM 802, and the RAM 803 are connected to each other by means of the communication bus 804. In the presence of the RAM 803, the ROM 802 is an optional module. The RAM 803 stores executable instructions, or writes the executable instructions to the ROM 802 during running, where the executable instructions enable the processor to perform corresponding operations of the foregoing communication method. An Input/output (I/O) interface 805 is also connected to the communication bus 804. The communication component 812 may be integrated, or may be configured to have a plurality of sub-modules (for example, a plurality of IB network cards) linked on the communication bus.

The following parts are connected to the I/O interface 805: an input section 806 including a keyboard, a mouse and the like; an output section 807 including a Cathode-Ray Tube (CRT), a Liquid Crystal Display (LCD), a loudspeaker and the like; a storage section 808 including hardware and the like; and the communication interface 809 of a network interface card including an LAN card, a modem and the like. A drive 810 is also connected to the I/O interface 805 according to requirements. A removable medium 811 such as a magnetic disk, an optical disk, a magneto-optical disk, a semiconductor memory or the like is mounted on the drive 810 according to requirements, so that a computer program read from the removable medium is installed on the storage section 808 according to requirements.

It should be noted that the architecture illustrated in FIG. 8 is merely an optional implementation mode. During specific practice, the number and types of the components in FIG. 8 may be selected, decreased, increased, or replaced according to actual requirements. Different functional components may be separated or integrated or the like. For example, the GPU and the CPU may be separated, or the GPU may be integrated on the CPU, and the communication element may be separated from or integrated on the CPU or the GPU or the like. These alternative implementations all fall within the scope of protection of the present disclosure.

Particularly, the process described above with reference to the flowchart according to the embodiments of the present disclosure is implemented as a computer software program. For example, the embodiments of the present disclosure include a computer program product, which includes a computer program tangibly included in a machine-readable medium. The computer program includes a program code for performing the method shown in the flowchart. The program code may include corresponding instructions for correspondingly performing the operations of the method provided in the embodiments of the present disclosure, for example, performing face detection on a to-be-processed image, to obtain at least one face region image included in the to-be-processed image and face key point information in the at least one face region image; and processing, for the at least one face region image, an image corresponding to a first region and/or an image corresponding to a second region in the face region image at least according to the face key point information in the face region image, where the image corresponding to the second region and the image corresponding to the first region are at least partially non-overlapping. In such embodiments, the computer program may be downloaded from a network by means of the communication element and installed, and/or be installed from the removable medium 811. When the computer program is executed by the processor, the functions defined in the method according to the embodiments of the present disclosure are executed.

It should be noted that according to requirements for implementation, the components/operations described in the embodiments of the present disclosure are separated into more components/operations, and two or more components/operations or some operations of the components/operations are also combined into new components/operations to achieve the purpose of the embodiments of the present disclosure.

The foregoing methods according to the embodiments of the present disclosure may be implemented in hardware or firmware, or implemented as software or computer codes stored in a recording medium (such as a CDROM, RAM, floppy disk, hard disk, or magneto-optical disk), or implemented as computer codes that can be downloaded by means of a network and are originally stored in a remote recording medium or a non-volatile machine-readable medium and will be stored in a local recording medium; accordingly, the methods described herein may be handled by software stored in a medium using a general-purpose computer, a special-purpose processor, or programmable or dedicated hardware (such as ASIC or FPGA). It may be understood that a computer, a processor, a microprocessor controller or programmable hardware includes a storage component (for example, a RAM, a ROM, or a flash memory) that can store or receive software or a computer code. When the software or the computer code is accessed and executed by the computer, the processor or the hardware, the processing method described herein is implemented. In addition, when the general-purpose computer accesses a code that is used for implementing processing shown herein, execution of the code converts the general-purpose computer to a special-purpose computer configured to execute the processing shown herein.

Persons of ordinary skill in the art may be aware that, in combination with the examples described in the embodiments disclosed in the specification, units and method operations may be implemented by electronic hardware or a combination of computer software and electronic hardware. Whether these functions are performed by hardware or software depends on the particular disclosures and design constraint conditions of the technical solutions. Persons skilled in the art may use different methods to implement the described functions for each particular disclosure, but it should not be considered that this implementation goes beyond the scope of the embodiments of the present disclosure.

The implementations above are merely intended to describe the embodiments of the present disclosure rather than limit the embodiments of the present disclosure. Persons of ordinary skill in the art may make modifications and variations without departing from the spirit and scope of the embodiments of the present disclosure. Therefore, all equivalent technical solutions shall also fall within the scope of the embodiments of the present disclosure, and the patent protection scope of the embodiments of the present disclosure shall be subject to the claims.

The invention claimed is:

1. A face image processing method, comprising: performing face detection on a to-be-processed image, to obtain at least one face region image included in the to-be-processed image and face key point information in the at least one face region image; and
   processing, for the at least one face region image, at least one of an image corresponding to a first region and an image corresponding to a second region in the face region image at least according to the face key point information in the face region image, wherein the image corresponding to the second region and the image corresponding to the first region are at least partially non-overlapping,
   wherein the performing face detection on a to-be-processed image comprises:
   performing face detection on the to-be-processed image by means of a pre-trained neural network,
   wherein the neural network is trained by:
   obtaining, by performing at least the information retention scrambling processing on the original sample image comprising the face feature point labeling information, the scrambled sample image and image information subjected to the information retention scrambling processing;
   detecting the original sample image and the scrambled sample image based on the neural network, to obtain first prediction information for face feature points in the original sample image and second prediction information for face feature points in the scrambled sample image;
   determining a first difference between the first prediction information and the labeling information, a second difference between the first prediction information and the second prediction information, and a third difference between the second difference and the image information subjected to the information retention scrambling processing, and
   adjusting network parameters of the neural network according to the first difference and the third difference,
   wherein the information retention scrambling processing comprises at least one of: affine transformation processing, translation processing, scaling processing, and rotation processing.

2. The method according to claim 1, wherein the processing at least one of an image corresponding to a first region and an image corresponding to a second region in the face region image at least according to the face key point information in the face region image comprises:
   receiving region division information input by a user, and determining at least one of the image corresponding to the first region and the image corresponding to the second region in the face region image according to the region division information; and
   processing at least one of the image corresponding to the first region and the image corresponding to the second region in the face region image at least according to the face key point information in the face region image.

3. The method according to claim 1, wherein the processing at least one of an image corresponding to a first region and an image corresponding to a second region in the face region image at least according to the face key point information in the face region image comprises:
   determining at least one of the first region and the second region in the face region image at least according to the face key point information in the face region image; and
   processing at least one of the image corresponding to the first region and the image corresponding to the second region in the face region image.

4. The method according to claim 3, wherein the determining at least one of the first region and the second region in the face region image at least according to the face key point information in the face region image comprises:
   obtaining a predetermined standard face template, wherein the standard face template comprises standard face key point information, a first predetermined region for indicating at least part of a skin region in a standard face, and a second predetermined region for indicating a region different from the first predetermined region in the standard face;

matching and deforming the standard face template according to the face key point information in the face region image and the standard face key point information; and determining at least one of the first region and the second region in the face region image at least according to at least one of the first predetermined region and the second predetermined region in a deformed standard face template, wherein the second predetermined region comprises a non-skin region in the standard face.

5. The method according to claim 4, wherein the determining at least one of the first region and the second region in the face region image at least according to at least one of the first predetermined region and the second predetermined region in a deformed standard face template comprises:

determining a region, in the face region image, corresponding to the first predetermined region in the deformed standard face template, as a first initial region;

screening and excluding non-skin pixels in an image corresponding to the first initial region;

determining a region, in the first initial region, from which the non-skin pixels are screened and excluded, as the first region; and determining a region, in the face region image, corresponding to the second predetermined region in the deformed standard face template, and a portion screened and excluded in the first initial region as the second region.

6. The method according to claim 3, wherein the processing at least one of the image corresponding to the first region and the image corresponding to the second region in the face region image comprises:

determining an acne/nevus/freckle region in the first region; and performing repairing processing on an image corresponding to the acne/nevus/freckle region in the image corresponding to the first region; or wherein the processing at least one of the image corresponding to the first region and the image corresponding to the second region in the face region image comprises:

determining an eye region in the second region; and performing enlargement processing on an image corresponding to the eye region in the face region image.

7. The method according to claim 1, wherein the processing at least one of an image corresponding to a first region and an image corresponding to a second region in the face region image at least according to the face key point information in the face region image comprises:

obtaining a predetermined standard face template, the standard face template comprising standard face key point information;

deforming the face region image according to the face key point information in the face region image and the standard face template; and processing at least one of the image corresponding to the first region and the image corresponding to the second region at least according to the face region image and a deformed face region image; or wherein the processing at least one of an image corresponding to a first region and an image corresponding to a second region in the face region image at least according to the face key point information in the face region image comprises:

obtaining a predetermined standard face template, the standard face template comprising standard face key point information;

matching and deforming the standard face template according to the face key point information in the face region image and the standard face key point information; and processing at least one of the image corresponding to the first region and the image corresponding to the second region at least according to a deformed standard face template.

8. The method according to claim 7, wherein the obtaining a predetermined standard face template comprises:

determining a standard face template required for current image processing, from at least two different standard face templates included in a predetermined standard face template set.

9. The method according to claim 7, wherein the processing at least one of the image corresponding to the first region and the image corresponding to the second region at least according to the face region image and a deformed face region image comprises:

whitening and/or reddening at least one of the image corresponding to the first region and the image corresponding to the second region, and generating at least one of a whitened face region image and a reddened face region image; and generating a final face region image according to the face region image, the deformed face region image, and at least one of the whitened face region image and the reddened face region image.

10. The method according to claim 1, wherein the processing at least one of the image corresponding to the first region and the image corresponding to the second region in the face region image comprises:

at least one of face-thinning, eye enlargement, eye enhancement, face smoothing, lip reddening/lip smoothing, dark eye circle removal/under-eye puffiness removal, face whitening/face reddening, and acne removal/nevus removal/freckle removal.

11. The method according to claim 10, wherein the processing at least one of the image corresponding to the first region and the image corresponding to the second region at least according to a deformed standard face template comprises:

blurring at least one of the image corresponding to the first region and the image corresponding to the second region to obtain a blurred face region image;

generating a deformed face region image according to the face region image and the deformed standard face template; and generating a smoothed face region image according to the deformed face region image, the blurred face region image, and the face region image.

12. The method according to claim 10, wherein the image corresponding to the second region comprises a lip image; and the processing at least one of the image corresponding to the first region and the image corresponding to the second region at least according to a deformed standard face template comprises:

reddening and/or blurring the lip image to obtain at least one of a reddened and blurred lip image;

generating a deformed lip image according to the lip image and the deformed standard face template; and generating a final lip image according to the deformed lip image, at least one of the reddened and blurred lip image, and the lip image.

13. The method according to claim 10, wherein the image corresponding to the second region comprises an under-eye set region image; and the processing at least one of the image corresponding to the first region and the image corresponding to the second region at least according to a deformed standard face template comprises:
blurring the under-eye set region image;
performing color migration on a blurred under-eye set region image;
generating a deformed under-eye set region image according to the under-eye set region image and the deformed standard face template; and
generating a final under-eye set region image according to the deformed under-eye set region image, the under-eye set region image after the color migration, and the under-eye set region image.

14. The method according to claim 1, wherein the performing at least information retention scrambling processing on an original sample image comprising face feature point labeling information comprises:
performing information retention scrambling processing and information non-retention scrambling processing on the original sample image comprising the face feature point labeling information.

15. The method according to claim 1, wherein the determining a first difference between the first prediction information and the labeling information comprises:
determining the first difference between the first prediction information and the face feature point labeling information in the original sample image by using a first loss function, wherein the first loss function is used for measuring the accuracy of a face feature point prediction result in the original sample image; and
wherein the determining a second difference between the first prediction information and the second prediction information comprises:
determining the second difference between the first prediction information and the second prediction information by using a second loss function, wherein the second loss function is used for measuring a difference between the face feature point prediction result in the original sample image and a face feature point prediction result in the scrambled sample image.

16. The method according to claim 15, wherein the determining the second difference between the first prediction information and the second prediction information by using a second loss function comprises:
obtaining a distance between the first prediction information and the second prediction information by means of a first distance calculation function, wherein the distance is the second difference; and
wherein the determining a third difference between the second difference and the image information subjected to the information retention scrambling processing comprises:
obtaining, by means of a second distance calculation function, a distance between the second difference and the image information subjected to the information retention scrambling processing, wherein the distance is the third difference.

17. A face image processing apparatus, comprising:
a memory storing processor-executable instructions; and
a processor arranged to execute the stored processor-executable instructions to perform steps of:
performing face detection on a to-be-processed image, to obtain at least one face region image included in the to-be-processed image and face key point information in the at least one face region image; and
processing, for the at least one face region image, at least one of an image corresponding to a first region and an image corresponding to a second region in the face region image at least according to the face key point information in the face region image, wherein the image corresponding to the second region and the image corresponding to the first region are at least partially non-overlapping,
wherein the performing face detection on a to-be-processed image comprises:
performing face detection on the to-be-processed image by means of a pre-trained neural network,
wherein the neural network is trained by:
obtaining, by performing at least the information retention scrambling processing on the original sample image comprising the face feature point labeling information, the scrambled sample image and image information subjected to the information retention scrambling processing;
detecting the original sample image and the scrambled sample image based on the neural network, to obtain first prediction information for face feature points in the original sample image and second prediction information for face feature points in the scrambled sample image;
determining a first difference between the first prediction information and the labeling information, a second difference between the first prediction information and the second prediction information, and a third difference between the second difference and the image information subjected to the information retention scrambling processing, and
adjusting network parameters of the neural network according to the first difference and the third difference,
wherein the information retention scrambling processing comprises at Last one of: affine transformation processing, translation processing, scaling processing, and rotation processing.

18. The apparatus according to claim 17, wherein the processing at least one of the image corresponding to a first region and the image corresponding to the second region in the face region image at least according to the face key point information in the face region image comprises:
receiving region division information input by a user, and determining at least one of the image corresponding to the first region and the image corresponding to the second region in the face region image according to the region division information; and
processing at least one of the image corresponding to the first region and the image corresponding to the second region in the face region image at least according to the face key point information in the face region image.

19. A non-transitory computer-readable storage medium having stored thereon computer-readable instructions that, when run in an electronic device, cause a processor in the electronic device to execute operations for implementing a face image processing method, the method comprising:
performing face detection on a to-be-processed image, to obtain at least one face region image included in the to-be-processed image and face key point information in the at least one face region image; and
processing, for the at least one face region image, at least one of an image corresponding to a first region and an image corresponding to a second region in the face region image at least according to the face key point information in the face region image, wherein the image corresponding to the second region and the image corresponding to the first region are at least partially non-overlapping, wherein the performing face detection on a to-be-processed image comprises:

performing face detection on the to-be-processed image by means of a pre-trained neural network, wherein the neural network is trained by:

obtaining, by performing at least the information retention scrambling processing on the original sample image comprising the face feature point labeling information, the scrambled sample image and image information subjected to the information retention scrambling processing;

detecting the original sample image and the scrambled sample image based on the neural network, to obtain first prediction information for face feature points in the original sample image and second prediction information for face feature points in the scrambled sample image;

determining a first difference between the first prediction information and the labeling information, a second difference between the first prediction information and the second prediction information, and a third difference between the second difference and the image information subjected to the information retention scrambling processing; and adjusting network parameters of the neural network according to the first difference and the third difference, wherein the information retention scrambling processing comprises at least one of: affine transformation processing, translation processing, scaling processing, and rotation processing.

* * * * *